United States Patent [19]

Figiel

[11] Patent Number: 4,753,735
[45] Date of Patent: Jun. 28, 1988

[54] SOLVENT AND APPARATUS AND METHOD FOR CLEANING AND DRYING SURFACES OF NON ABSORBENT ARTICLES

[75] Inventor: Frances J. Figiel, Boonton, N.J.

[73] Assignee: Allied-Signal Inc., Morris Township, Morris County, N.J.

[21] Appl. No.: 921,909

[22] Filed: Oct. 27, 1986

Related U.S. Application Data

[63] Continuation of Ser. No. 710,764, Mar. 11, 1985, abandoned.

[51] Int. Cl.$^4$ .......................... B01D 15/00; B08B 7/04
[52] U.S. Cl. ...................................... 210/664; 134/11; 134/12; 203/41; 210/195.1; 210/196; 210/257.1; 210/266; 210/689; 210/774; 210/799; 210/805; 210/806
[58] Field of Search ................................. 134/10, 11, 12; 202/170; 203/41, 47; 210/194, 195.1, 196, 197, 251, 252, 257.1, 258, 259, 266, 284, 295, 663, 664, 689, 774, 799, 805, 806

[56] References Cited

U.S. PATENT DOCUMENTS

| | | | |
|---|---|---|---|
| 3,015,576 | 1/1962 | Hendrixson | 202/170 X |
| 3,079,286 | 2/1963 | Kearney et al. | 134/12 |
| 3,340,199 | 9/1967 | Clay et al. | 252/171 |
| 3,386,181 | 6/1968 | Steinacker | 34/9 |
| 3,438,892 | 4/1969 | Wymore et al. | 210/689 X |
| 3,502,586 | 3/1970 | Bauer et al. | 210/689 X |
| 3,559,297 | 2/1971 | Figiel | 34/9 |
| 3,573,213 | 3/1971 | Burt | 134/40 X |
| 3,589,023 | 6/1971 | Figiel | 34/9 |
| 3,710,450 | 1/1973 | Figiel | 34/9 |
| 3,789,006 | 1/1974 | McMillan et al. | 252/171 |
| 3,903,009 | 9/1975 | Bauer et al. | 134/40 X |
| 3,960,746 | 6/1976 | Gorski | 252/171 |
| 4,014,751 | 3/1977 | McCord | 202/170 X |
| 4,052,328 | 10/1977 | Figiel | 134/38 |
| 4,062,794 | 12/1977 | Figiel | 134/40 X |
| 4,277,336 | 7/1981 | Henschel, Jr. | 210/196 |
| 4,378,303 | 3/1983 | Hisamoto et al. | 252/171 X |

OTHER PUBLICATIONS

Simon, *Cleaning System Tailored for Water-Extendables,* Industrial Finishing, pp. 44–45, 12/84.

Primary Examiner—Richard V. Fisher
Assistant Examiner—W. Gary Jones
Attorney, Agent, or Firm—Jay P. Friedenson

[57] ABSTRACT

A method, liquid and apparatus is disclosed that is capable of effectively removing contaminated liquids from nonabsorbent articles. Articles wet with such liquids are immersed in azeotropic mixtures. Liquid film is displaced by the azeotrope which, in turn, is purified through a still and recycled. Articles moved through a vapor phase are clean and dry. In a typical operation, articles to be cleansed and dried are introduced into the solvent then rinsed and then elevated into a vapor zone. Suitable heating coils maintain the desired temperatures in the various compartments. In the vapor zone, all liquid film is changed to vapor while the article temperature is raised above ambient to prevent moisture condensation on the surface of the article upon removal from the system. In the solvent treating or reprocessing compartment, solvent with any accumulated moisture contained is processed through a molecular sieve (solvent dessicant) and filtered and the solvent collected and recirculated. Solvent is continuously pumped and filtered to remove any particulate matter. The filtered product is then fed through a still and through a flow control valve and the solvent is distilled to separate all nonvolatile impurities. In a solvent desiccant section any residual moisture is removed before the solvent is filtered and is returned. Where the needs warrant, ultrasonic means may be employed as the desired agitation means in lieu of or in addition to the agitators and/or turbulence generated by the boiling action of the solvent.

9 Claims, 1 Drawing Sheet

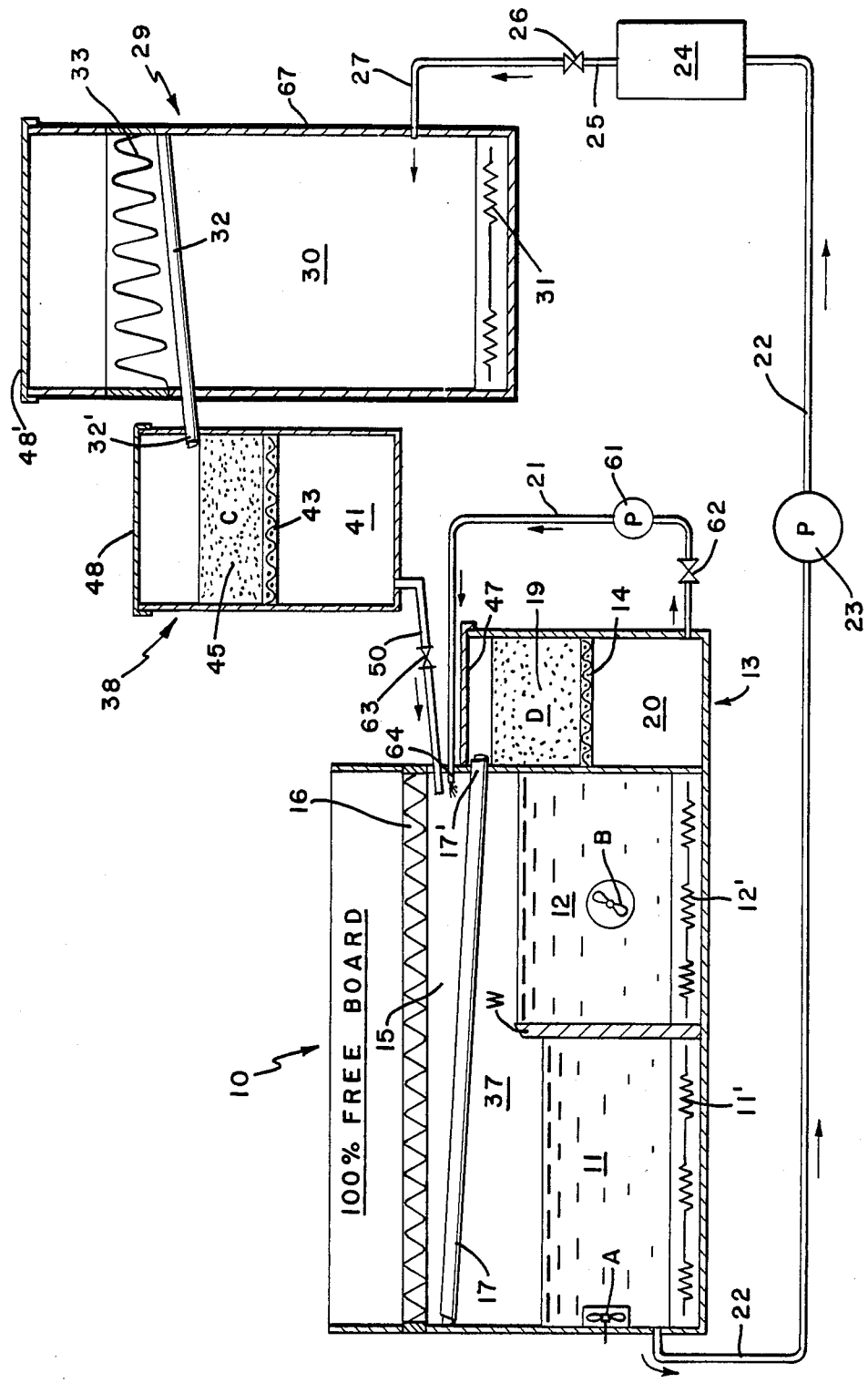

SOLVENT AND APPARATUS AND METHOD FOR CLEANING AND DRYING SURFACES OF NON ABSORBENT ARTICLES

This application is a continuation of application Ser. No. 710,764 filed Mar. 11, 1985, now abandoned.

DESCRIPTION

BACKGROUND OF THE INVENTION

This invention relates to an improved azeotropic solvent drying and cleaning system which include a volatile solvent that has a capability of removing water, hydrophilic residues or other films from the surface of substrates and a novel apparatus and method. Removal of the hydrophilic and water containing residues from the substrate surface to be cleaned is effected by displacement or dissolution; cleaning in this manner avoids multi-stage cleaning and drying steps and, in the case of metals, avoids potential corrosion of the kind that results when aqueous cleaning methods are used.

A variety of lubricants, including the conventional petroleum oil type, the water soluble oils and the synthetic or semisynthetic fluids are employed in metal working. Some of these fluids pose a difficult problem when attempts are made to completely cleanse and dry and free the surface of such materials. Vapor degreasers using chlorinated solvents such as 1,1,1-trichloroethane, trichloroethylene, perchloroethylene or methylene chloride are common methods of cleaning metal and other non-absorbent surfaces and work effectively on surface films that are hydrophylic and are typically comprised of oil, water surfactants, metal salts and the like. However, these chlorinated solvents frequently break down and form corrosive hydrochloric acid in the presence of water. Also, many cleaning schemes are not designed to remove water as well as cleaning the surface, a problem that is especially acute when water-extendable metalworking fluids are to be cleaned in a vapor degreaser with a chlorinated solvent.

While the problems resulting from handling water contaminated cleaning fluid could be alleviated by placing only dried or non-water heated parts in the degreaser, this option is not practical especially because a dry film present on an article is often difficult to remove satisfactorily. Also, the elapsed time required to allow parts to dry increases the work-in-process inventory. Requiring parts to sit prior to cleaning increases handling, lowers productivity and reduces manufacturing flexibility.

In my U.S. Pat. Nos. 3,559,297; 2,589,023 and 3,710,450, systems were disclosed for removing water films from cleaned substrates. The present invention deals with a system for the treatment of substrates which are contaminated and require cleansing as well as drying; the operation being effected by a single cleansing/drying system.

It is thus apparent that a need exists for an effective solvent surface cleaning and drying system and, particularly, a system which is readily renewable by separating the water and accumulated surface contaminants therein during use of the solvent without encountering substantial interference by the build up of water and contaminants in the solvent.

SUMMARY OF THE INVENTION

It is an object of the present invention to provide a cleansing and drying system and solvent compositions that produces improved drying capabilities. The solvent employed can withstand severe use in the water desorption and cleansing operations without a substantial change in the cleaning and drying capability of the solvent. A more particular object of the invention is to provide an effective azeotropic solvent composition that resists the formation of stable emulsion and permits the cleaning solvent to displace hydrophilic films with minimal loss in the cleansing efficiency of the fluid.

This invention provides a method, an azeotropic cleansing/drying composition and apparatus capable of effectively removing contaminated surface films from nonabsorbent articles. Articles contaminated with metal working liquids and/or treating compositions are immersed in azeotropic mixtures. The surface liquid film is removed by either being displaced or dissolved by the azeotropic solvent which, in turn, is purified through a still and solvent desiccants and recycled. Articles moved through a vapor phase of the azeotropic solvent are withdrawn clean and dry.

With the cleaning and drying system of the invention, typically the contaminated, parts are immersed into the working sump containing the heated azeotropic solvent; contaminants remaining on parts are displaced by the azeotropic solvent. The solvent containing the contaminants removed from the surface and containing dissolved oil, displaced water and particulate matter is freed of these contaminants by continuously passing it through the still and solvent desiccants. The dried and cleaned distillate solvent is fed into the boiling working sumps. In subsequent steps of the cleaning operation, the article is rinsed. Thereafter, the article is vapor dried. In the vapor drying, the parts are held in the azeotropic solvent vapor until the parts reach the vapor temperature. Parts normally remain in the solvent vapor until condensation stops. With dwell times typically being of the order of 30 seconds to 2 minutes, depending on the surface area-to-mass ratio and substrate type. As the parts are withdrawn form the vapor, the solvent evaporates, leaving the article clean and dry.

The cleaning and drying system of the invention in essence contemplates an integrated system using a particular method, apparatus and an azeotropic cleansing solvent; this system is more particularly specified as follows:

The method contemplates immersing an article covered by a liquid (water) contaminated with residual inorganic salts and organic matter into a solvent bath. The liquid solvent is capable of dissolving only minimal amounts of water therein, i.e. between about 0.001–0.5 percent by weight of water based on the weight of the solvent. The solvent bath is subjected to vigorous agitation by any physical means to enhance the cleansing of the surface of treated articles including, for example, heating the bath to boil to produce turbulance throughout the bath, stirring, ultrasonics, and the like, thereby displacing and dissolving surface residue film from the article. The solvent containing the displaced contaminated liquid is transferred directly to a still, which uses a molecular sieve to dry the solvent; the distillate is then returned to the solvent bath. The article is removed from the solvent bath and reimmersed in the second bath (second sump). Thereafter, the article is removed and subjected to a rinse with clean and dry distillate and short hold in the vapor phase of the azeotropic solvent.

The apparatus of the invention which is adapted to carry out the aforementioned method-process is comprised essentially of the following in combination: A first sump adapted to contain the azeotropic-solvent and means to agitate the liquid-solvent are provided in the said first sump. A second sump similar to the first is provided; in which the azeotropic solvent returned from the distillation process and freed of the contaminants overflows into the first sump. At least one of the sumps is provided with a heating means to boil the azeotropic solvent to generate vapors above the solvent liquid. The distillate is passed through molecular sieves comprising a solvent desiccant and is filtered before entering the second sump. The still is equipped with means to maintain constant distillation rate to provide an appropriate amount of azeotrope solvent flow.

The azeotropic compositions of the invention have good wetting ability and solvency power to displace hydrophylic residues associated with water and to dissolve organic contaminants. Typically, these azeotropes must be capable of boiling between 30° C. and 46° C. have a solubility of water of between 0.001 and 1.0 weight percent based on the weight of the azeotropic solvent and be stable in the presence of water and white metals, such as aluminum and galvinized steel. These cleansing/drying liquid solvents employed are the azeotropic composition of trichlorotrifluoroethane and at least one aliphatic alcohol of 1 to 5 carbon atoms and may optionally contain one or more components typical examples of mixtures are trichlorotrifluoroethane-isopropanol; trichlorotrifluoroethaneisopropanol-nitromethane; trichlorotrifluoroethane-isopropanol ethanol-nitromethane and trichlorotrifluoroethane-acetone-hexane-nitromethane.

BRIEF DESCRIPTION OF THE DRAWING

The figure of the drawing is a schematic view of an embodiment of the apparatus of the invention showing the components of the system comprising a main product treating vessel, the solvent purifier, the primary solvent dryer, and the secondary solvent dryer.

DETAILED DESCRIPTION OF THE INVENTION AND OF THE PREFERRED EMBODIMENTS

As seen by reference to FIG. 1 of the drawing, the novel apparatus of the invention comprises a plurality of sequential product treating compartment. Basically the compartments include the product treating or main vessel 10, the solvent purifier still 29, the primary solvent drying system vessel or container 38, and the secondary drying solvent vessel 13.

The main treating vessel 10, comprised of one or preferably two rectangular treating compartments, a first compartment 11 and a second compartment 12. The main treating vessel 10 is equipped with a cooling jacket 16 which functions to condense vapors and inhibit solvent loss and out the vapor zone 37 above the boiling azeotropic liquid and with heating elements 11', 12'. Additionally, agitating means A, B and/or alternatively, a transducer (not shown may be used) to provide ultrasonic energy to promote loosening of particles or metal salts residues that are on the processed articles during the cleaning process. The agitating devices are also employed to keep undissolved matter in suspension, preventing them from redeposition, especially if the nature of the articles being processed does not allow use of temperatures at which the boiling solvent would provide sufficient agitation. In addition, the first main treating vessel 10 is equipped with a trough 17 slightly inclined toward the entrance 17 to the secondary solvent drying system to permit condensed vapors and moisture to flow by gravity toward the point 17' where the solvent is fed into the secondary drying vessel 13. Each of the four components operations respresented by the vessels 10, 13, 29 and 38 is connected with each other by piping generally referred to by conduits 22, 25, 27, 32, 50, 17, 21 that allows the solvent to flow through the four component sections of the apparatus and which flow is regulated by a series of pumps 23, 61 and valves 26, 62, 63.

The primary and secondary drying operations effected in sections the primary solvent dryer 38 and the secondary dryer 13, respectively are each comprised of two compartments 45, 41, and 19, 20 respectively separated by filter cartridges 43 and 14, respectively so that particulate matter ejected or washed off from the molecular sieves and is retained and does not contaminate the solvent in the compartments 11 and 12 of the main treating vessel 10. Each of the vessels 38 and 13 has removable covers 48 and 47 respectively. The size of compartments 19 and 45 depends on the volume to accommodate a mass of approximately 10 to 20 lbs of solvent desiccant contained in cartridges C & D that are inserted into the compartments 45 and 19. The solvent desiccant is a molecular sieve resin commercially available from various sources such as, for example, Union Carbide Corporation, Fisher Scientific Company, etc. and is sold under various trade names. Such as Davison type 3A or 4A Grade 514, 8–12 mesh beads. Water adsorption capacity of these sieves is at least 10 percent by weight, water retention rate 40–70 percent by weight at a flow rate of about 7 gallons/hour/20 lb. of sieve at each pass to yield a drying effectiveness capable of removing at least 40 percent of the water present for each pass through the molecular sieve. These sieves can be regenerated by known means such as passing through desorption such as by placing them in an oven at 140° C. for about 48 hours. The lower vessels 41, 20 of the primary and secondary solvent drying systems 38 and 13 hold sufficient amount of a solvent to maintain a working volume. In the space 41 sufficient volume of solvent is maintained with controlled release through valve 63 to have a working volume of the azeotropic solvent in vessels 11 and 12. The flow of the solvent through the valve 63 must be in balance with the out flow of solvent removed through pump 23.

The volume of solvent in space 20 must be sufficient to rinse articles upon removal of the article from the immersion steps in compartments 11 and 12. In the secondary solvent drying system, the clean solvent flows from compartment 20 through valve 62, pump 61, pipe 21 and outlet 64. Outlet 64 may be suitably connected to an arrangement such as a spray nozzle (not shown) that facilitates rinsing of the article to be cleaned and dried with the azeotropic solvent.

In the primary solvent drying system, the clean solvent flows from vessel 41 through pipe 50, valve 63 to the main treating sump 11,12. An auxiliary filtering system 24 used to remove particulates which inadvertantly find their way into the solvent during processing of articles and may, through physical forces associated with flash distillation, contaminate the solvent vapors in the still 29. The still 29, which purifies the solvent comprises a suitable compartment 30 equipped with heating elements 31, cooling jacket 33 and a condensing trough 32 that is connected at 32' with the primary drying solvent system 38. The still 29, functions to remove relatively high boiling components from the contaminated azeotropic mixture maintained operational through suitable conventional solvent flow level control means (not shown) that cuts off the power when solvent level drops below a predetermined level. Insulation 67 is employed to maintain efficiency and conserve energy. A removable cover 48' prevents solvent emissions.

In the process circuit, the solvent from the treating vessel 11 flows through pipe 22, pump 23, filter 24, pipe 25, valve 26 and pipe 27 to the still 29 where it is changed to vapor and condensed at the cooling mantel 33 in the purifier 29 and flows via trough 32 into vessel 38 at 32'; where it passes through the solvent desiccant cartridge C in chamber 45, filter 43 and passes 43 into chamber 41 from where it then flows via pipe 50 and valve 63 into the treating vessels of 11 and 12.

The solvent, in the treating vessels, upon contact with the articles contaminated with water and associated contaminants, e.g. hydrated residues from water based lubricants or precious metals from plating solution, wets the nonabsorbent surfaces and in the process replaces the contaminants with a film of the solvent. The contaminants lifted from the surface of the article mixed with and are carried away with the solvent. The azeotropic cleaning solvent forms a mixture of various compositions. This solvent which is maintained in an agitated state is removed through the pipe 22 and pump 23, auxiliary filter 24 and passes to the purifier 29. At the same time the solvent supply is constantly replenished by flow of solvent from compartments 41 and 20, retaining an appropriate solvent purity and working volume. The article is rinsed with the filtered solvent from compartment 20 to assure a high level of cleanliness of the article. Additionally, the article is held in the vapor zone 15 where all the liquid film of the rinse solvent is changed into its vapor while the article temperature is raised above the ambient; this prevents moisture condensation on the surface of the article.

The process may vary in sequences from the above, e.g. first immersion of the article in boiling solvent, then optionally in non-boiling solvent, rinsing and finally exposure of the article in the vapor zone. The process is advantageously independent of the amount of water film on the article purity of these films, presence of some other hydrated residues in the film and type of treated articles, glass, metal plastic, equipment and other articles having non-absorbent surfaces.

The solvent employed in the novel system of the invention is an azeotropic mixture of 1,1,2-trichloro 1,2,2 trifluoroethane (R-113) or its isomeric mixture with one or more co-solvents which form an azeotrope. These co-solvents belong to the group of aliphatic alcohols and ketones and nitromethane. Specifically included are ethanol, isopropanol, nitromethane and acetone. Azeotropic mixtures which may be employed include these disclosed in U.S. Pat. Nos. 3,789,006 and 4,052,328. The solvent azeotropes are totally evaporative, leaving no residues, being not flammable, having threshold limit values about 500 ppm as defined by American Conference of Governmental and Industry Hygienists (ACGIH). These azeotropic solvents are compatible with material of construction of the articles processed. Additionally, these solvents have a water solubility limited to no more than 0.1 weight percent and preferable to not more than 0.05 weight percent water and which themselves are soluble in water to no more than 0.1 weight percent. The azeotropes may be two or more component mixtures which are recognized by those skilled in the arts, as being azeotrope-like or constant boiling mixtures. It is important that said mixtures have a good wetting ability and chemical stability.

The above data show that the system is capable of continuously disposing large quantities of water without affecting this capability of thoroughly drying wet articles.

A typical cleaning process of aluminum parts to be used in the aircraft industry, the apparatus and an azeotrope contemplated by the invention will now be described in accordance with the invention. The aluminum parts, which have been machined and are covered with a film of water based lubricant, are cleaned and dried by reference to the system of the invention. The residue on the parts is typically an oil in water emulsion which is used as a lubricant in the machining of the parts and comprises, as the main ingredients, water, a water soluble detergent and oil. These lubricants are often difficult to remove completely from the surface because of electrostatic or polar forces. Also, the nature of the films are such that they are not normally wholly dissolvable in organic solvents and in the course of conventional cleaning operation chlorinated solvents are used such as trichloroethylene and trichloroethane. Such materials often present environmental or stability problems and are generally impractical.

In the cleaning and drying operation, using the system of the invention the parts are placed in an open (perforated) stainless steel carrier and immersed in solvent in compartment containing the azeotropic composition of trichlorotrifluoroethane, ethanol, isopropanol and nitromethane in a weight ration of 93.5; 3.5; 2.0; 1.0, respectively.

The parts are maintained in the boiling solvent in sump 11 for 1 to 2 minutes then rinsed with purified solvent and dried in vapor zone 15. The parts may be optionally immersed again in solvent in compartment 12 in which case the rinsing would then be effected after the second immersion only. The parts are then elevated into the vapor zone 15 where the parts are held until condensation on the parts ceases, a period of about 1-2 minutes. The parts are then removed and transferred for further processing. The emulsion film removed from the parts is partially dissolved and contaminates the azeotropic solvent mixture in the compartment 11 and, to a lesser extent, the solvent mixture in compartment and 12. This film also forms a separate phase with some components of the emulsion. In purifying the contaminated azeotropic solvent; it is drawn through pipe 22 and filtered at 24 to remove unsoluble particulates and introduced into the purifier still 29. In the still 29, the azeotropic mixture is distilled over into the primary drier 38 where the azeotropic solvent is dried through the molecular sieve C to remove moisture and then filtered through filler 43 to remove residual particles or bits of particles that may be generated by the granules of the molecular sieve. The filtered solvent is then collected in chamber 41, and transferred through pipe 50 to the treating bath 12. When the compartment 12 is filled, the excess overflows the weir W into compartment 11. The effect is to maintain a relatively pure composition in compartment 12 inasmuch as the contaminated azeotropic solvent is displaced by purified and dried solvent from chambers 41 and 20 and is carried over the Weir W to compartment 11. In the vapor zone 15, the condensing vapor is collected in the trough 17 and channeled through the molecular sieve D. The condensate typically contains quantities of moisture, the amount of which may vary to some extent depending on the ambient humidity. The azeotropic solvent passing through the molecular sieve is freed of the moisture content filtered at 14 collected at 20 and then pumped via line 21 and optionally comprises at least in part, the rinse solvent which may be directed at the parts after the parts have been raised out of the bath and are held in the vapor zone.

It will be apparent to those skilled in the art that numerous modifications and changes may be made to the embodiments described herein without departing from the scope and spirit of the invention.

What is claimed:

1. A method for cleaning and drying the surface of non-absorbent articles to remove hydrophilic residues which comprises:
   (a) immersing an article in a boiling liquid azeotropic organic solvent bath which has a density greater than water and in which water is soluble in an amount not greater than 0.1 weight percent to displace or dissolve said hydrophilic residues:
   (b) lifting the article free from the liquid solvent;
   (c) reimmersing the article in a second, non-boiling bath of said azeotropic solvent which has a greater purity than the bath of step (a);
   (d) lifting the article from the solvent bath of step (c) and into a vapor phase of said azeotropic solvent in a vapor zone;
   (e) condensing liquid azeotropic solvent from said vapor phase, freeing the condensed solvent of moisture and rinsing the article while it is in said vapor phase with said liquid azeotropic solvent that is totally freshly condensed and is substantially freed of moisture;
   (f) retaining said article in the vapor zone of said azeotropic solvent until condensation of vapor on the article has ceased;
   (g) continuously removing and purifying said liquid azeotropic solvent from step (a) which has been contaminated with hydrophilic residues as a result of said cleaning, which purification comprises
      (i) filtering said contaminated liquid azeotropic solvent from step (a) to free it of particulates,
      (ii) subjecting the filtered liquid azeotropic solvent from step (ii) to distillation to separate therefrom the relatively high boiling components, and
      (iii) subjecting the distillate from step (ii) to drying to substantially remove any residual amount of moisture; and
   (h) regulating the return flow of said substantially dried, azeotropic solvent from step (iii) to the bath of step (c).

2. The method in accordance with claim 1 in which water is soluble in said azeotropic organic solvent in an amount not greater than 0.05 weight percent.

3. The method in accordance with claim 1 wherein organic solvent in the solvent bath of step (c) is used to replenish the solvent bath of step (a).

4. The method in accordance with claim 3 in which said replenishing is accomplished by overflow of solvent from the bath of step (c) to the bath of step (a).

5. The method in accordance with claim 1 in which the drying in accordance with step (g) (iii) is accomplished by flowing the distillate through a molecular sieve.

6. The method in accordance with claim 1 wherein agitation is provided in the reimmersion bath of step (c).

7. The method of claim 1 wherein the azeotropic mixture from step (g) (iii) is filtered before introducing it to step (h).

8. The method according to claim 1 wherein vapor condensed above the first and second baths is collected, dried and reintroduced to the baths.

9. The method according to claim 8 wherein the dried condensate is filtered prior to reintroducing it to said baths.

* * * * *